Nov. 8, 1927.

T. PETERSEN 1,648,589

DIESTOCK

Filed Aug. 25, 1924

Inventor
Thorwald Petersen
By
N.Z. Lurl
Attorney

Patented Nov. 8, 1927.

1,648,589

UNITED STATES PATENT OFFICE.

THORVALD PETERSEN, OF ERIE, PENNSYLVANIA, ASSIGNOR TO REED MANUFACTURING COMPANY, OF ERIE, PENNSYLVANIA, A CORPORATION OF PENNSYLVANIA.

DIESTOCK.

Application filed August 25, 1924. Serial No. 733,946.

This invention is designed to facilitate the securing of chasers to die stock heads. As now ordinarily made chasers are secured to heads by passing a screw through the chaser into the head and clamping the head to the chaser by means of the screw. In changing the chaser this involves entirely removing the screw from the head and as such changes are quite frequent involve quite a loss of time. With the present invention it is only necessary to back off the screw very slightly, the head being swingingly mounted on the screw so that it may be swung to pass through the opening in the head.

The invention is illustrated in the accompanying drawings as follows:—

Figure 1:
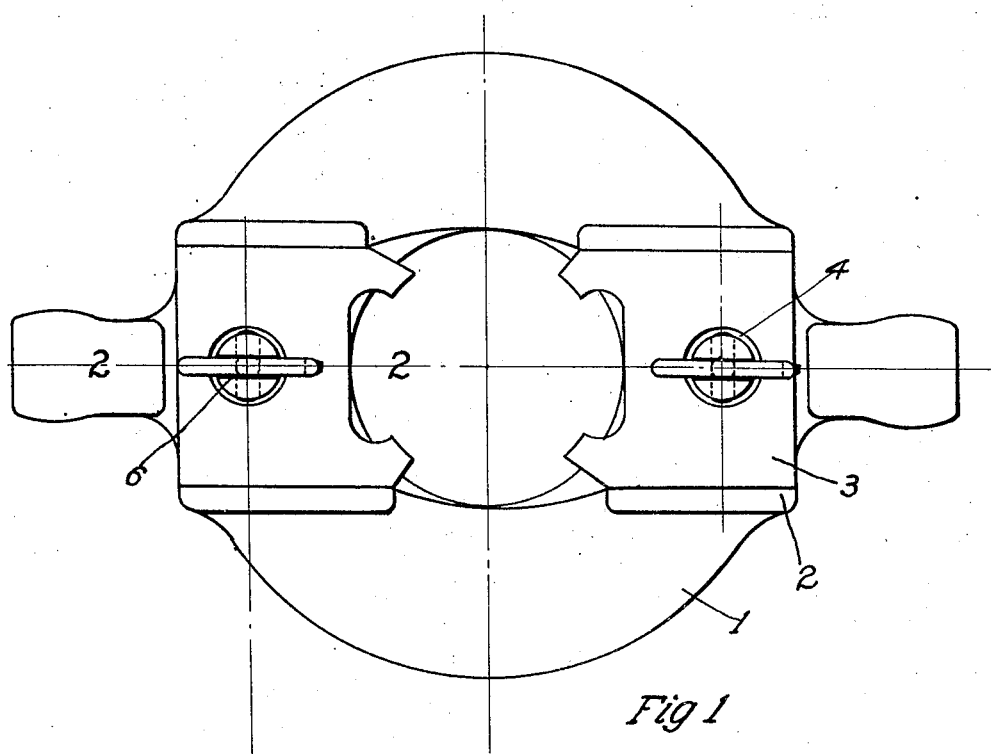

Fig. 1 shows a plan view of the head.

Figure 2:
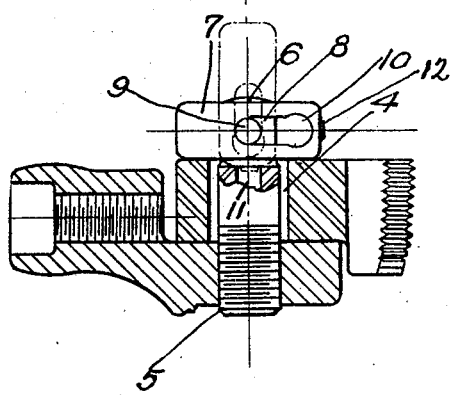

Fig. 2 a section on the line 2—2 in Fig. 1.

1 marks the head, 2 guide seats for the chasers and 3 the chasers.

The chasers have the usual openings 4. Screws 5 extend through the openings 4 into the head. Each screw is provided with a notch 6 at its outer end and a head 7 is arranged in this notch. The head 7 is arranged in the notch 6. It is provided with a slot 8 through which a pin 9 extends. The slot is preferably enlarged at one end as at 10 to facilitate this turning.

With the head turned crosswise and centrally located as shown in Fig. 2 it bridges the opening 4 and engages the chaser so as to clamp it in place as the screw is turned to place. The plate forms a wing head as it were by which the screw may be turned. As the screw is backed off so as to loosen the head, the head may be moved sidewise and turned into alignment with the screw. In this position the chaser may be removed from the screw, the head passing through the opening. Thus only a very slight movement of the screw is necessary to secure and release the chaser.

By making the enlargement 10 the plate when moved to one side swings readily by merely withdrawing the chaser. Further the enlargement gives a little more clearance so that the plate more readily swings. In this way the operator holding the die in one hand can loosen the screw, move the plate to one end and simply lift the chaser, the head swinging under the pressure from the chaser.

In order that the plate when swung to the vertical position may ordinarily retain this position so that new dies can be readily put in place I prefer to make a small socket 11 at the bottom of the slot 6 and a small projection 12 at the bottom of the plate so that when the plate is turned in a vertical position the projection 12 will fall into the socket 11 and thus tend to hold the plate in the vertical position.

What I claim as new is:—

1. In a die stock, the combination of a die head; a chaser mounted on the die head, said chaser having an opening therethrough; a screw extending through the chaser into the die head; a screw head having a slot; and a cross pin on the screw extending through the screw head, said head being adapted to be swung into alinement with the screw to pass through the opening and to bridge the opening when swung crosswise of the screw.

2. In a die stock, the combination of a die head; a chaser mounted on the die head, said chaser having an opening therethrough; a screw extending through the chaser into the die head; a screw head having a slot with an enlargement at one end; and a cross pin on the screw extending through the screw head, said head being adapted to be swung into alinement with the screw to pass through the opening and to bridge the opening when swung crosswise of the screw.

3. In a die stock, the combination of a die head; a chaser mounted on the die head, said chaser having an opening therein; a screw extending through the chaser into the die head, said screw having an axial socket therein; a screw head having a slot therein and a projection at its end adapted to enter the socket in the screw with the head in alinement with the screw; and a cross pin on the screw extending through the screw head, said screw head being adapted to be swung into alinement with the screw to pass through the opening and to bridge the opening when swung crosswise of the screw.

In testimony whereof I have hereunto set my hand.

THORVALD PETERSEN.